United States Patent [19]

Manson

[11] 4,271,702
[45] Jun. 9, 1981

[54] GRAVITY SENSOR

[76] Inventor: Lewis A. Manson, 4602 Waring, Houston, Tex. 77027

[21] Appl. No.: 83,256

[22] Filed: Oct. 10, 1979

[51] Int. Cl.³ .......................................... G01M 19/00
[52] U.S. Cl. .................................... 73/382 R; 33/365
[58] Field of Search ........................ 73/382 R, 382 G; 33/365, 391, 398; 368/134, 135, 136, 137, 138

[56] References Cited
U.S. PATENT DOCUMENTS

| 328,142 | 10/1885 | Rhodes | 368/136 X |
| 2,000,948 | 5/1935 | Hayes | 73/382 |
| 2,217,123 | 10/1940 | Malmqvist | 73/382 |
| 2,439,035 | 4/1948 | Bidwell et al. | 73/66 X |

Primary Examiner—Jerry W. Myracle
Attorney, Agent, or Firm—Gunn, Lee & Jackson

[57] ABSTRACT

For use in a gravity meter, an improved gravity sensor is disclosed which, in the preferred and illustrated embodiment, balances on an axis of rotation which is perpendicular to the vertical component of gravity, thereby enabling the arm on the apparatus to respond to horizontally resolved components of gravity.

9 Claims, 3 Drawing Figures

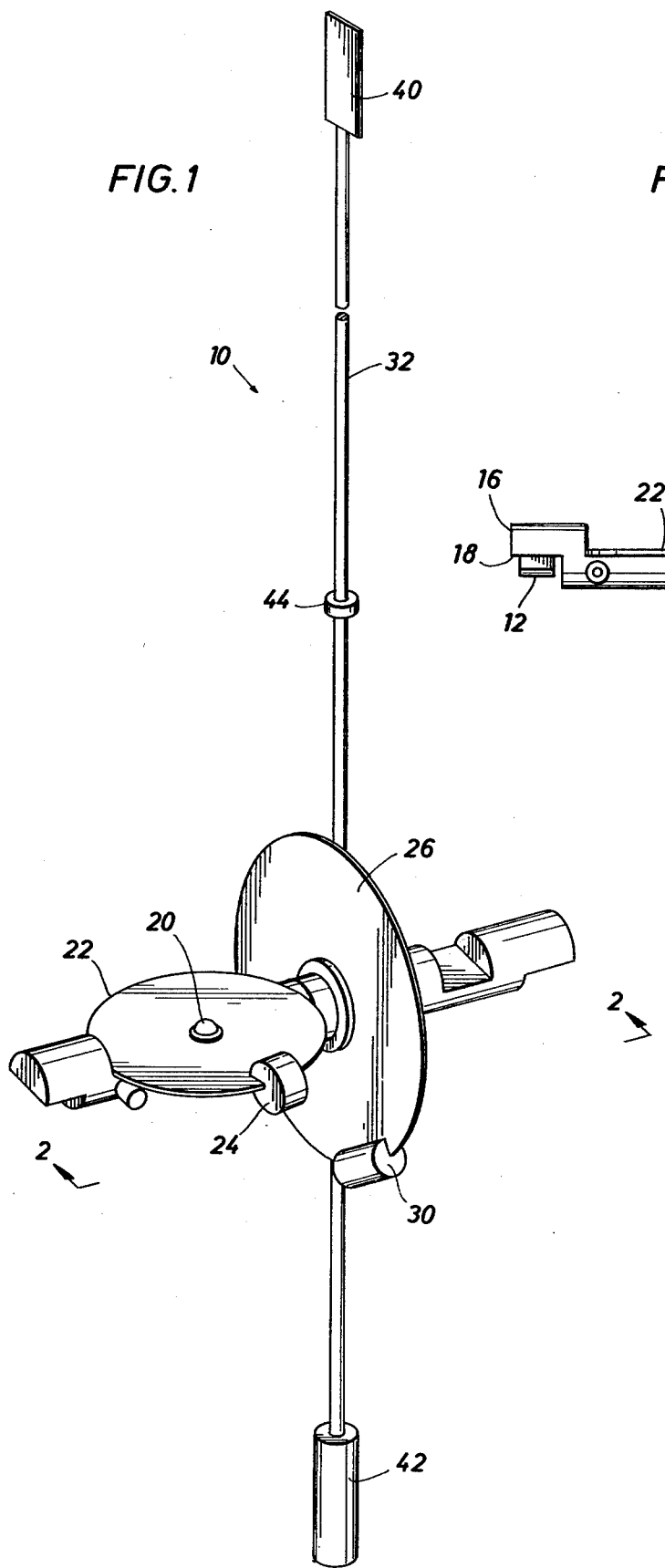
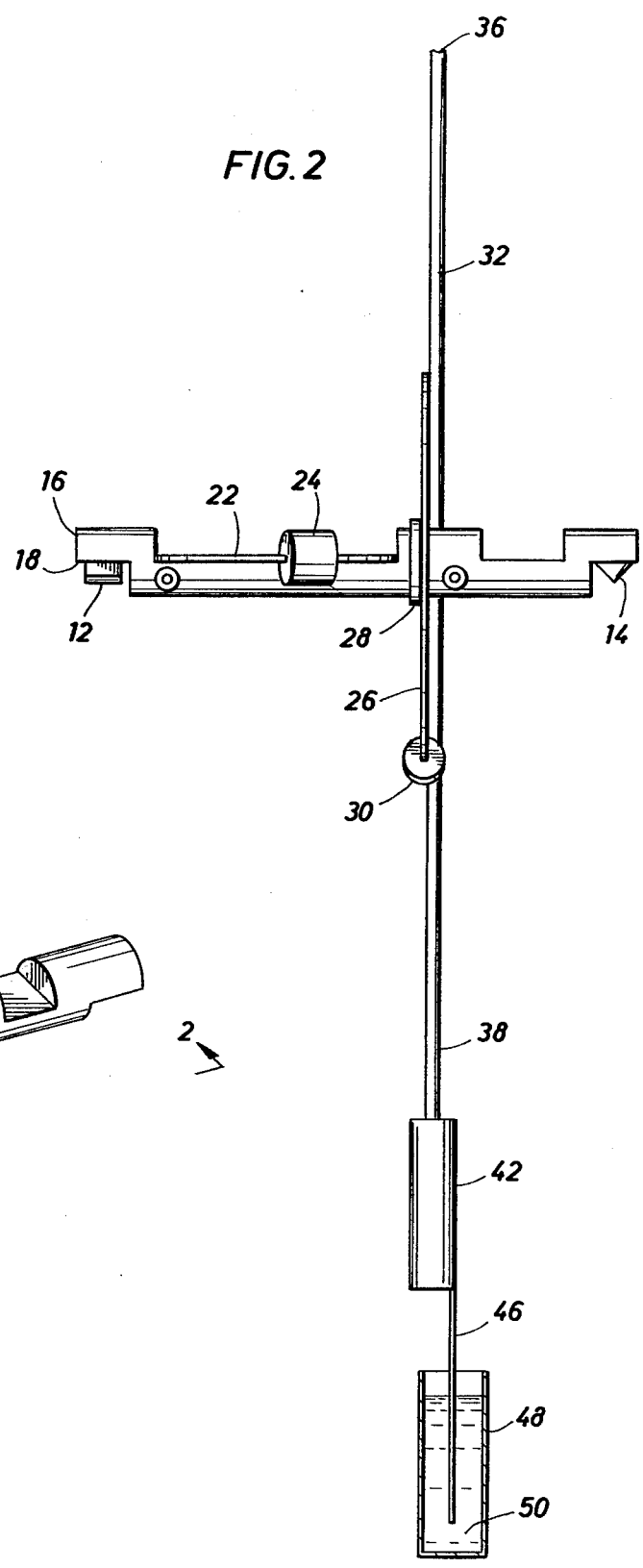

GRAVITY SENSOR

BACKGROUND OF THE DISCLOSURE

In measuring gravity, it is first defined as a vector force between the earth and a mass which is attracted to the earth. Being a vector, gravity has three components defined along mutually perpendicular directions. Co-pending U.S. patent application Ser. No. 083,351 filed Oct. 10, 1979 is directed to an apparatus which measures one of the component vectors. This disclosure is directed to an apparatus which measures the horizontal component of gravity. By defining the coordinate system such that the major component of gravity is a vertical component along the Y-axis, there still remains a pair of horizontal components which are mutually perpendicular to one another. Assigning an arbitrary dimension in conformance with well known standards, they can easily be described as the north-south component which is perpendicular to an east-west component. For the sake of brevity, these will be referred to hereinafter as the north and east components. They are measured by the same apparatus, the apparatus being simply rotated to a different axis of rotation for the equipment.

It is perhaps somewhat simplistic to state that gravity is solely a component force acting on a mass from the center of the earth. The center of the earth is the dominant force in terms of magnitude. Gravity, however, is a three-dimensional vector. It is formed by the addition of vector forces acting on a mass from other bodies more remote than the earth. As will be recognized, the attractive force of the earth is quite large compared to other forces, but they, nevertheless, exist. Other celestial bodies contribute forces which are added as vectors so that the net force acting on a test instrument or mass of interest is the resultant vector from all of these celestial bodies acting together. This is a recognized fact from time immemorial in observation of the tides which are influenced by the moon. Thus, the moon contributes to the net gravity force acting at a given point.

This disclosure is directed to a gravity instrument which records horizontal components of gravity. The horizontal components are thus the two remaining components of the three-dimensional gravity vector which acts on a body. It has been discovered that the horizontal components are reasonably significant in geological prospecting. Consider the instance where a large metallic ore body near the surface of the earth is mapped. A vertical component gravity measuring instrument of the sort disclosed in co-pending U.S. patent application Ser. No. 083,351 filed Oct. 10, 1979 can be moved over the ore body to detect anomolies in a gravity map which are indicative of the ore body. It has been discovered, however, that mapping horizontal components of gravity at points to the side of the ore body will also indicate the presence of the ore body. In other words, the anomoly of a large ore body alters measurements in gravity in all dimensions. Needless to say, there is a scale factor involved which is dependent on the closeness of the ore body, the mass of the ore body, the specific gravity of the ore within the ore body and other scale factors. However, it is important to note that the ore body anomoly is not limited solely to vertical components of gravity.

The present apparatus is a structure which detects variations in the horizontal components of gravity. The apparatus accomplishes this result by first nulling the apparatus so that the center of gravity is on a line with the axis of rotation of the equipment. The axis of rotation is adjusted as a preliminary step to a horizontal position. Horizontal can be determined as, for instance, in the use of a bubble level. By so doing, the vertical component of gravity acts merely to keep the equipment aligned with the horizontal. The equipment, having an extended lower arm which points toward the center of the earth, is thereafter able to rotate with variations in horizontal gravity. In other words, variations in horizontal gravity are sensed by the balanced lower arm. The lower arm is closer to the center of mass of the earth and is, therefore, more susceptible to gravity force variations. As variations occur, the lower vertical arm is attracted in a measure of horizontal components of gravity. The angular deflection of the lower arm is proportionate to changes in gravity.

BRIEF SUMMARY OF THE DISCLOSURE

This disclosure is directed to a gravity measuring system which measures the horizontal components of gravity. It utilizes a mounting shaft which, in conjunction with a set of supports, defines an axis of rotation. It is nulled until the center of mass or center of gravity coincides with the axis of rotation. It utilizes a pair of arms, one extending upwardly and the other extending downwardly. A slight off-balance weight adjusts the center of gravity so that it favors the lower arm. This arm responds then to horizontal components of gravity and moves in accordance with fluctuations therein.

BRIEF DESCRIPTION OF THE DRAWINGS

So that the manner in which the above recited features, advantages and objects of the invention, as well as others which will become apparent, are attained and can be understood in detail, a more particular description of the invention briefly summarized above may be had by reference to the embodiments thereof illustrated in the appended drawings, which drawings form a part of this specification. It is to be noted, however, that the appended drawings illustrate only typical embodiments of the invention and are not to be considered limiting of its scope, for the invention may admit to other equally effective embodiments.

FIG. 1 discloses the gravity meter of the present invention in perspective view, the apparatus incorporating movable weights to adjust during calibration;

FIG. 2 is a side view of the structure shown in FIG. 1 which illustrates additional details of construction.

DETAILED DESCRIPTION OF THE PREFERRED EMBODIMENT

Figure 3:
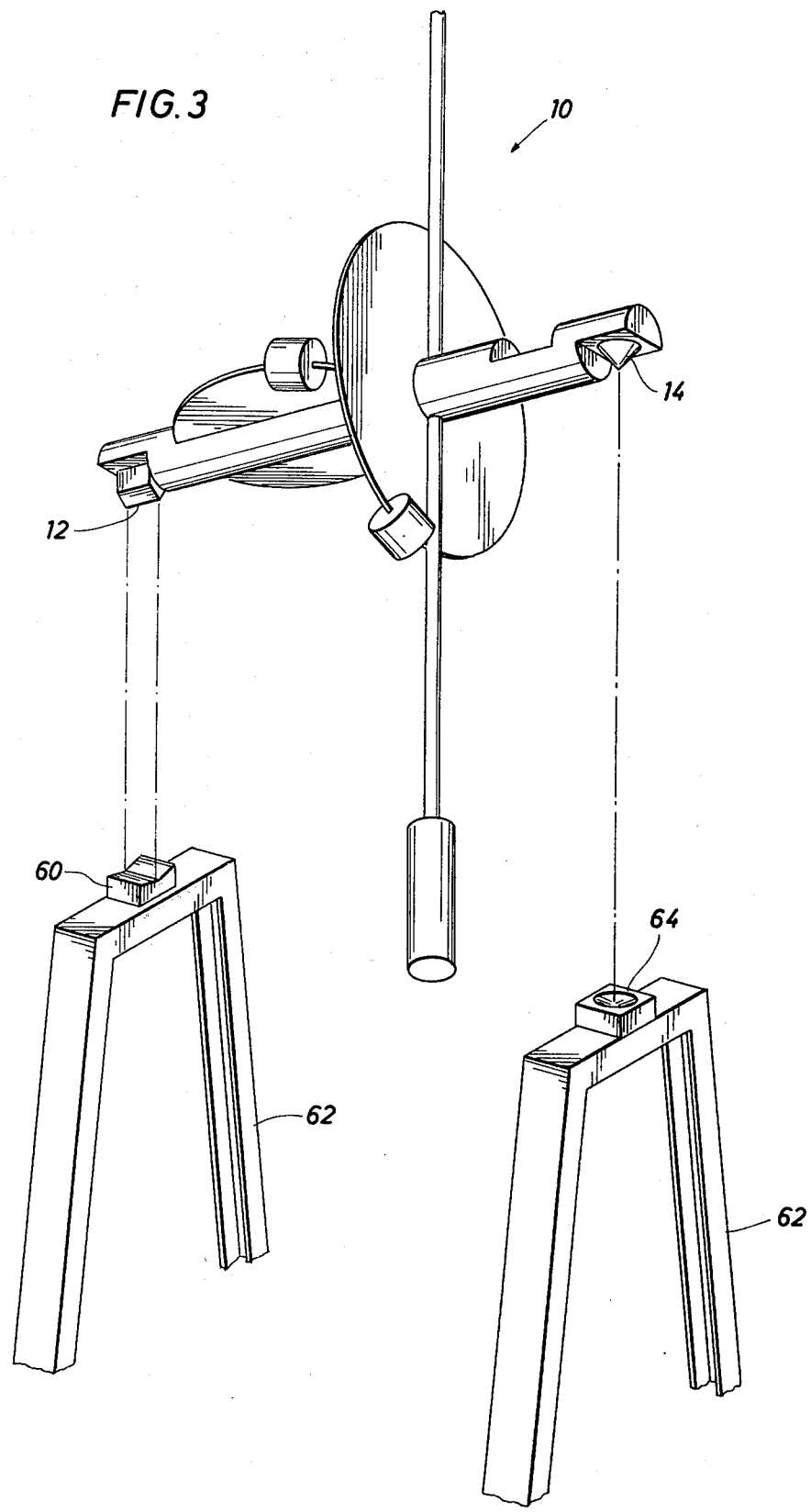
FIG. 3 is a perspective view of the mounting apparatus of the present invention.

Attention is first directed to FIG. 1 of the drawings, wherein the numeral 10 identifies a gravity instrument which responds to the horizontal components of gravity which are defined hereinabove. Briefly, gravity is a vector and can, therefore, be resolved into three vector components. One component is the vertical component which is measured by an apparatus exemplified in co-pending U.S. patent application Ser. No. 083,351 filed Oct. 10, 1979. While gravity has a large vertical component, it also has a pair of perpendicular horizontal components which are of great scientific interest. They are measured differently than vertical components. They have the same use, namely, assisting in preparation of geological maps.

FIG. 1 discloses the gravity sensor of the present invention which is rotated about a horizontal axis. Accordingly, it must have a support system which enables it to rotate about this axis. This support system is obtained through the use of a point and knife edge which are separated. As depicted in FIG. 2, a pair of sloping faces come together at 12 to define a knife edge. A conic surface 14 defines a point. The apex of the surface 14 lies on a common line with the edge 12. This defines the axis of rotation for the equipment. The knife edge 12, when extended, will pass through the apex and thereby determine the axis of rotation of the equipment. This axis is leveled at the time of installation, and leveling the equipment avoids impact of the vertical component of gravity.

As shown in the drawings, the numeral 16 identifies a mounting shaft which functions somewhat as an axle. It is fairly large and substantial, typically formed of round stock and having faces or notches cut in it. A face 18 defines a location whereby the tapered knife edge 12 is supported and anchored. The shaft 16 is also notched to receive a mounting bolt 20 shown in FIG. 1. The mounting bolt 20 passes through a circular disk 22 which is incorporated as a counterbalance. The disk 22 supports a weight 24 at its outer periphery. The disk and weight are adjusted by slightly loosening the mounting bolt 20. This is a procedure utilized in leveling the instrument for the initial calibration. It will be appreciated that the weight 24, being off center, serves as a counterbalance whereby the center of gravity of the apparatus is aligned with the axis through the equipment.

The mounting shaft 16 is circular in cross section where notches have not been formed in it. It supports a large disk 26 which is supported, in turn, on a friction shoulder 28 about the shaft. The shoulder 28 engages the shaft to limit or retard rotation. The disk 26 supports a counterbalance weight 30 which is movable when the disk is rotated. The weights 24 and 30 are thus moved to achieve initial calibration.

The shaft 16 is drilled with a hole which perfectly intersects the axis of rotation. A very long rod 32 is positioned in this drilled hole. The rod 32 extends upwardly and has an upper arm 36. It has a lower portion which is described as the lower arm 38. The upper arm terminates at a sensor disk or target 40 shown in FIG. 1. A counterbalance weight 42 is suspended on the lower arm 38. A friction engaged, slidable weight 44 is on the upper arm. It is raised and lowered to adjust the center of gravity.

To limit the rate of excursion, a relatively thin rod 46 is appended at the lower end as shown in FIG. 2 of the drawings. The rod 46 extends into a container 48 which is filled with a liquid 50. As the rod moves through the liquid 50, its movement is damped. The equipment is thus able to respond to horizontal variations in gravity, but the response is not too rapid. This is highly desirable because horizontal gravity changes are relatively slow to occur. Damping, therefore, prevents oscillations and overshoot. The damping shown in the drawings is typically adequate. Extending the rod 46 into the liquid 50 to a depth of a few centimeters to ordinarily adequate. Heavy liquids can be used, but the viscosity of oil is normally adequate. The rod 46 is typically round and less than 1.0 centimeter in diameter.

The present apparatus is supported on the structure shown in FIG. 3 of the drawings. In FIG. 3 of the drawings, the point or apex 14 is on a common line with the knife edge 12. The knife edge is defined by a pair of faces which intersect at a specified acute angle. The angle can typically be in the range of 20.0 to 90.0 degrees. There are no critical limits on this angle. The knife edge rests in a V-shaped trough of a support block 60 which defines an upwardly facing pair of faces having an angle larger than the angle of the knife edge 12. This enables the knife edge to define a single line of contact and to also rotate. To this end, rotation is permitted because the knife edge is relatively sharp, inscribing an angle less than the angle on the face of the support block 60. The support block 60 is supported on a frame or base 62.

The numeral 64 identifies a support block which has an upper face with a dished area terminating at a point. The dished area is constructed with a shallow, dished indentation, the angle of the indentation being larger than the angle of the apex. As an example, if the apex inscribes an angle of 90.0 degrees, the dish area might well inscribe an angle of about 160.0 degrees. This will permit rotation of the apparatus about the point of contact of the apex in the dished area of the support 64.

The support blocks 60 and 64 are spaced apart. It is especially important that they be aligned so that the support block 60 defines an axis of rotation which passes through the apex of the dished area at 64. The spacing between the two blocks is not critical; once the apex 14 has been rested in the dished area, the knife edge 12 can be moved laterally to accommodate manufacturing tolerances in the shaft 16. Indeed, the knife edge might have a width of 1.0 to 4.0 centimeters, while the support block can be somewhat wider. By this construction, the knife edge can move laterally relative to the support block 60 in initial setup of the equipment so that tight control of manufacturing of the shaft 16 and positioning of the support blocks is not required in all dimensions.

The device is used in the following manner. After mounting the horizontal sensor as shown in FIG. 1, the two rotatable disks are moved to reposition the weights whereby the center of gravity is brought into line with the axis of rotation. As each adjustment is made, the device becomes more and more free to rotate with gravity variations. The device, being sensitive to horizontal gravity components, utilizes the vertical component of gravity to merely hold the sensor in place on the axis of rotation. Once the center of gravity is adjusted to coincide with the axis of rotation, the next step is to move the weight 44 downwardly. This readjusts the center of gravity to a common point in line with the lower arm 38. In other words, the center of gravity is then adjusted so that it is located on the arm 38, the lower arm extending below the remaining portions of the equipment.

After adjustment of the center of gravity to a point below the axis of rotation, but coincident with the lower arm 38, the equipment is then ready to be used. The device is relatively sensitive to variations in the horizontal component. Such variations can then be observed by observation of the target 40 on the upper arm. Co-pending U.S. patent application Ser. No. 083,351 filed Oct. 10, 1979 discloses a system for tracking the movement or position of a disk. The recording apparatus thus detects and follows the pattern of movement of the disk 40.

The device of the present invention can be initially balanced with the arms substantially vertical. The initial calibration requires that the arms be positioned more or less vertically. It is not mandatory that they be vertical at the beginning time. Rather, adjustment of the center of gravity through manipulation of the counterbalance weights on the apparatus can adjust the device to a sensitivity able to detect the rising of planets over the horizon. Consider as an example the initial calibration of the equipment where there are no planets visible above the horizon. To the extent that planets have gravity components acting on the test instrument, such components are substantially overpowered by the vertical component of gravity. However, when a planet rises on the horizon, its component of gravity is primarily a horizontal vector, and it is sufficiently large compared to the other horizontal vectors acting on the instrument that the arm 38 is deflected in the direction of the rising planet. Needless to say, a rising planet just appearing over the horizon of the earth has two horizontal components which are mutually perpendicular. One is parallel to the axis of rotation of the equipment which is insensitive to that component. The rising of a planet at a location at 90.0 degrees relative to the axis of rotation clearly forms a deflection which is proportionate to horizontal gravity fluctuations. In the example stated above, the rising of a planet on the horizon of the earth requires several hours. The planet eventually moves to its zenith. When it is substantially near its zenith, the field of gravity acting on the test instrument attributable to the planet is negligible inasmuch as the vector is approximately aligned oppositely of the vector attributable to the attraction of the earth. Because this happens so slowly, the equipment responds substantially without inertia. The impact or effect of inertia becomes negligible in light of the long time required for most gravity fluctuations.

The apparatus of the present disclosure is preferably formed of nonferrous materials. It is preferably utilized in a shielded atmosphere or environment. It is preferably utilized in a temperature stabilized environment devoid of air currents. The device is also utilized in a dark chamber to avoid creating biasing forces acting on the device from ambient light.

Detection of movement of the device can be visually achieved by observing the disk 40 as it moves relative to a fixed scale. Automation of the measuring system can be achieved through the detector equipment which is disclosed in U.S. patent application Ser. No. 083,351 filed Oct. 10, 1979. To this end, the arm 32 might be 1.0 or 2.0 meters in length. The entire system has a mass in the range of 5.0 to about 25.0 kilograms; a sufficient mass for structural rigidity is desirable, but no specific weight need be achieved.

While the foregoing is directed to the preferred embodiment, the scope of the present disclosure is determined by the claims which follow.

I claim:

1. An instrument responsive to horizontal components of gravity acting on the instrument comprising:
   (a) a central horizontal shaft;
   (b) mounting means for mounting said shaft along a horizontal axis perpendicular to a vertical toward the earth;
   (c) movable counterbalance means supported by said shaft and movable to adjust the center of gravity of the test instrument to a specified location vertically aligned with the horizontal axis for said shaft;
   (d) an elongate arm having a pair of separated ends supported on said shaft and positioned thereby so that one of said ends is located at a remote location and is adapted to be pulled below said shaft, said end extending therefrom and positioned to rotate said shaft on horizontal variations of gravity;
   (e) wherein said shaft is elongate between a pair of spaced, downwardly extending supports which supports comprise a portion of said mounting means;
   (f) wherein said supports terminate at the horizontal axis; and
   (g) including cooperative support receiving means aligned with the horizontal axis to receive said supports;
   (h) one of said supports comprises a pair of intersecting faces defining a knife edge wherein said knife edge defines the horizontal axis which is coincident therewith;
   (i) the second of said supports includes an apex on the horizontal axis;
   (j) both of said support receiving means comprise a V-shaped profile on the top face of a pair of spaced solid bodies wherein said V-shaped profile, if extended, passes through both of said faces to support said knife edge and said apex therein; and
   (k) said knife edge and said apex rotate as a unit through a specified angle relative to said V-shaped profiles while resting thereon, said knife edge and apex comprising the sole support for the test instrument.

2. The apparatus of claim 1 wherein said arm is perpendicular to the horizontal axis and comprises an upper portion above said shaft and a lower portion below said shaft and wherein said lower end thereof is adapted to be positioned between said supports to rotate said shaft.

3. The apparatus of claim 2 wherein said arm includes a weight slidably mounted thereon.

4. The apparatus of claim 3 including a conformed face on one of said bodies with a point in the face thereof.

5. The apparatus of claim 4 wherein said shaft supports first and second counterbalances, each of which is supported thereon by an elongate and movable mounting arm.

6. The apparatus of claim 5 wherein said mounting arms are pivotally joined to said shaft.

7. The apparatus of claim 6 including an acute pair of faces intersecting to define said knife edge and wherein said apex is a point on a cone.

8. The apparatus of claim 7 wherein said knife edge is located at the nether end of a circular post joined to said shaft and wherein said apex is located at the nether end of a second post joined to said shaft.

9. An instrument responsive to horizontal components of gravity acting on the instrument comprising:
   (a) a central horizontal shaft;
   (b) mounting means for mounting said shaft along a horizontal axis perpendicular to a vertical toward the earth;
   (c) movable counterbalance means supported by said shaft and movable to adjust the center of gravity of the test instrument to a specified location vertically aligned with the horizontal axis for said shaft;
   (d) an elongate arm having a pair of separated ends supported on said shaft and positioned thereby so that one of said ends is located at a remote location and is adapted to be pulled below said shaft, said end extending therefrom and positioned to rotate said shaft on horizontal variations of gravity;

(e) wherein said shaft is elongate between a pair of spaced, downwardly extending supports which supports comprise a portion of said mounting means;
(f) wherein said supports terminate at the horizontal axis; and
(g) including cooperative support receiving means aligned with the horizontal axis to receive said supports;
(h) knife edge means coinciding with the horizontal axis rotation through a specified angle relative to the horizontal axis, said knife means comprising the sole support for the test instrument and wherein said knife edge means is located on both of said downwardly extending supports.

* * * * *